(12) United States Patent
Hamon et al.

(10) Patent No.: US 10,548,327 B2
(45) Date of Patent: Feb. 4, 2020

(54) DEVICE FOR INDIVIDUALLY COOKING A PLURALITY OF CULINARY PREPARATIONS

(71) Applicant: EKIM, Montevrain (FR)

(72) Inventors: Cyrill Hamon, Montevrain (FR); Sébastien Roverso, Bussy-Saint-Georges (FR); Faustine Calvarin, Emerainville (FR)

(73) Assignee: EKIM, Montevrain (FR)

( * ) Notice: Subject to any disclaimer, the term of this patent is extended or adjusted under 35 U.S.C. 154(b) by 0 days.

(21) Appl. No.: 16/074,052

(22) PCT Filed: Feb. 2, 2017

(86) PCT No.: PCT/EP2017/052237
§ 371 (c)(1),
(2) Date: Jul. 30, 2018

(87) PCT Pub. No.: WO2017/134156
PCT Pub. Date: Aug. 10, 2017

(65) Prior Publication Data
US 2019/0037855 A1    Feb. 7, 2019

(30) Foreign Application Priority Data

Feb. 3, 2016  (FR) ...................... 16 50847

(51) Int. Cl.
*A47J 37/04*   (2006.01)
*A21B 1/44*    (2006.01)
*A47J 37/06*   (2006.01)

(52) U.S. Cl.
CPC .............. *A21B 1/44* (2013.01); *A47J 37/041* (2013.01); *A47J 37/046* (2013.01); *A47J 37/0611* (2013.01)

(58) Field of Classification Search
CPC .... A47J 37/046; A47J 37/041; A47J 37/0611; A47J 37/067
(Continued)

(56) References Cited

U.S. PATENT DOCUMENTS 1,599,556 A * 9/1926 Cook .................... A47J 37/046
                                                        126/41 A
1,631,655 A * 6/1927 Sunderland ........... A47J 37/046
                                                        126/41 A (Continued)

FOREIGN PATENT DOCUMENTS

| AU | 763526 B2 | 7/2001 |
| WO | 2004100667 A2 | 11/2004 |
| WO | 2008098341 A1 | 8/2008 |

OTHER PUBLICATIONS

French Search Report from French Patent Application No. 1650847, dated Oct. 3, 2016.
(Continued)

*Primary Examiner* — Reginald Alexander
(74) *Attorney, Agent, or Firm* — Greer, Burns & Crain, Ltd.

(57) ABSTRACT

A device for cooking culinary preparations, includes:
a cooking chamber, capable of simultaneously receiving several individual culinary preparations,
a primary heater, arranged in order to heat the cooking chamber and deliver a thermal power called primary thermal power to at least one part of the culinary preparations,
a moveable plate, inside the cooking chamber, and including at least one plurality of cooking sites, each being arranged in order to receive a culinary preparation, and
secondary heater, including a plurality of heating elements, arranged in order to follow the displacement of the moveable plate, each heating element being asso- (Continued)

ciated with one of the cooking sites and being arranged in order to heat preferentially the top of this cooking site by delivering a thermal power called secondary thermal power.

19 Claims, 2 Drawing Sheets

(58) Field of Classification Search
USPC .......... 99/423, 424, 389, 390, 391, 396, 395
See application file for complete search history.

(56) References Cited

U.S. PATENT DOCUMENTS

| | | | | |
|---|---|---|---|---|
| 3,204,549 A * | 9/1965 | Palowsky | ............. | A47J 37/046 |
| | | | | 219/388 |
| 3,277,813 A * | 10/1966 | Luscher | ................ | A47J 37/046 |
| | | | | 219/388 |
| 3,340,793 A * | 9/1967 | Nilsen | ...................... | A21B 5/03 |
| | | | | 99/423 |
| 3,604,338 A * | 9/1971 | Fiedler | ................. | A47J 37/046 |
| | | | | 99/339 |
| 3,756,140 A * | 9/1973 | Kolivas | ................ | A47J 37/046 |
| | | | | 126/25 C |
| 4,119,834 A * | 10/1978 | Losch | ................. | A47J 36/2483 |
| | | | | 108/23 |
| 4,191,881 A * | 3/1980 | Ahlgren | .................... | A21D 8/06 |
| | | | | 219/388 |
| 4,538,050 A * | 8/1985 | Willett | ...................... | A21B 1/44 |
| | | | | 219/388 |
| 6,250,210 B1 * | 6/2001 | Moreth | .................... | A21B 1/44 |
| | | | | 126/19 R |
| 6,998,582 B1 | 2/2006 | Maroti | | |
| 8,761,588 B2 * | 6/2014 | Lee | ..................... | A47J 37/0629 |
| | | | | 219/385 |
| 2002/0022071 A1 | 2/2002 | Hansen | | |
| 2011/0209661 A1 | 9/2011 | Fritz-Jung et al. | | |
| 2012/0185086 A1 | 7/2012 | Khatchadourian et al. | | |
| 2014/0216434 A1 | 8/2014 | Moreth, III et al. | | |
| 2014/0311355 A1 | 10/2014 | Hegarty et al. | | |

OTHER PUBLICATIONS

International Search Report from International Patent Application No. PCT/EP2017/052237, dated May 3, 2017.
Written Opinion of the International Searching Authority from International Patent Application No. PCT/EP2017/052237, dated May 3, 2017.

* cited by examiner

DEVICE FOR INDIVIDUALLY COOKING A PLURALITY OF CULINARY PREPARATIONS

BACKGROUND

The present invention relates to a device for cooking culinary preparations. It also relates to an automated machine for preparing culinary preparations in an automated manner using such a device, a simultaneous and individualized method for cooking several culinary preparations using such a device, and the utilization of the present device for cooking pizzas.

The present invention is situated within the field of catering—fast-food, traditional or semi-industrial—and more particularly the field of oven cooking devices.

In a known manner, ovens comprising several cooking sites make it possible to cook several culinary preparations simultaneously. These can be for example pizza ovens. In their simplest form, these ovens comprise a cooking chamber, a heat source, optionally a temperature sensor, and regulation means making it possible to regulate the (average) temperature and/or the thermal power within the cooking chamber. The drawback of such ovens is that they do not allow the cooking temperature to be controlled locally at the level of each culinary preparation loaded in the cooking chamber.

Now, the temperature within the cooking chamber may be uneven, according to the type of heat source used and its positioning inside said cooking chamber, which may result in a temperature and/or a heating duration that is/are unsuitable for certain preparations, and/or a poor quality of cooking. Furthermore, the cooking time and temperature and/or power parameters may differ from one culinary preparation to another, depending on the ingredients to be cooked, distribution thereof at the surface and/or inside the culinary preparation and/or the mass and the volume of the preparation. Ovens having a single cooking chamber and/or a single heat source thus do not allow individualized cooking of the different preparations to be carried out.

Also, document WO 2008/098341 A1 is known, which describes a pizza oven comprising a cooking chamber, a main heat source (wood firebox) making it possible to bring the cooking chamber up to the desired temperature, a rotary hearth comprising several cooking sites and, in a particular embodiment, heating means situated on the rotary hearth, below each cooking site. The technical problem that this oven seeks to resolve is to reduce uneven temperatures inside the cooking chamber. This unevenness is associated specifically with the use of a main heat source situated in the centre of said cooking chamber and creating a radial temperature gradient therein. The temperature unevenness (of the rotary hearth) is also associated with the presence or absence of pizzas on the cooking sites. Use of the secondary heating means situated over the rotary hearth, combined with the main heat source, for heating the entire cooking chamber thus allow improved control of unevenness of temperature inside the cooking chamber.

However, this oven is not arranged to control the individual temperature of each cooking site using the heating means situated on the rotary hearth. At most, for an even cooking temperature inside the cooking chamber, and thus identical over each cooking site, the cooking time of each pizza situated on the cooking sites is adapted as a function of the recipes.

Thus the solution implemented in this document does not allow pizzas to be cooked simultaneously at temperatures and for durations that differ from one to another.

Nor does the pizza oven described allow optimum cooking of pizzas constituted by frozen ingredients placed on chilled dough.

In fact, in this particular case, the energy inputs to be supplied are very different for optimum cooking of both the dough and the ingredients: the chilled dough requires a constant cooking temperature, preferentially comprised between 250 and 330° C. and a cooking time varying between 2 and 6 minutes according to the cooking temperature in order to avoid burning the surface layers of said chilled dough while allowing the deeper layers to cook and rise during cooking; on the other hand, the frozen ingredients placed on the surface of the sheeted chilled dough require cooking in three successive steps: during a first step, the ingredients are firstly defrosted, then, during a second step, the water released during the first step is evaporated, and finally the ingredients are cooked in the course of a third step.

Document US 2014/0311355 A1 is also known, which describes an oven for cooking pizzas in a cooking chamber comprising a main heat source situated in the centre of the cooking chamber and around which turns a cooking plate on which pizzas are loaded. The main heat source described is a burner, onto the flame of which the cooking chamber is open, making it possible to obtain a particular cooking effect on the pizzas loaded therein, comparable to that of a grill. A screen is placed in proximity to said flame in order to limit the grill effect to a delimited sub-region inside the cooking chamber.

Furthermore, independent secondary heat sources are placed below the cooking plate in order to compensate for the unevenness of temperature inside the chamber, in particular associated with the specific geometry of the main heat source. The secondary heat sources are not driven rotatably about the main heat source. This oven thus makes it possible to cook several pizzas simultaneously according to a certain regime established inside the oven, which is identical for all the pizzas loaded in the oven. This oven does not allow said pizzas loaded in the oven to be cooked according to different simultaneous cooking cycles (duration, temperature).

The purpose of the present invention is to solve the aforementioned problems at least partially and also to lead to further advantages.

A further purpose of the invention is to facilitate the simultaneous cooking of several culinary preparations while reducing oversight by a cook.

A further purpose of the present invention is to be able to cook several culinary preparations simultaneously in an individualized manner in one and the same cooking chamber.

A further purpose of the invention is to be able to control more accurately the thermal power brought to bear on each culinary preparation during cooking.

A further purpose of the present invention is to be able to cook a culinary preparation composed of frozen and refrigerated ingredients using one and the same device and in the course of one and the same cooking procedure.

SUMMARY

According to a first aspect of the invention, at least one of the aforementioned objectives is achieved with a device for cooking a culinary preparation and comprising (i) a cooking chamber, capable of simultaneously receiving several individual culinary preparations, (ii) a primary heating means, arranged in order to deliver a thermal power, called primary thermal power, making it possible to heat the cooking chamber—and preferentially a part of the culinary preparations, (iii) a moveable plate—preferably rotatable—capable of being displaced inside the cooking chamber, and comprising a plurality of cooking sites, each being arranged in order to receive a culinary preparation, (iv) secondary heating means, comprising a plurality of heating elements, capable of being displaced—preferably in rotation—inside the cooking chamber so as to follow a displacement of the moveable plate, each heating element being associated with one of the cooking sites and being arranged in order to deliver a thermal power, called secondary thermal power, making it possible to heat preferentially the top of this cooking site.

According to the first aspect of the invention, the cooking chamber is arranged in order to allow several culinary preparations to be loaded therein so that they can be cooked simultaneously. The dimensions of the cooking chamber are conditioned by the desired cooking throughput. The invention is principally intended for traditional or semi-industrial catering structures in which the culinary preparations produced are intended to be consumed rapidly after production thereof, on the premises or to take away. Thus the present invention aims non-limitatively to cook preferentially between four and eight culinary preparations at the same time, for example six culinary preparations.

Preferentially, the cooking device according to the first aspect of the invention is used for cooking pizzas, quiches, pies or cakes.

The primary heating means is arranged in order to heat the inside of the cooking chamber so as to bring it up to a predetermined temperature compatible with cooking the culinary preparations present in said cooking chamber. Typically, the operating temperatures are comprised between 150° C. and 450° C.

The primary heating means can be of any known type, but according to a preferential embodiment, it comprises at least one electrical resistance arranged inside the cooking chamber. In order to supply thermal power as evenly as possible and ensure an even temperature inside the cooking chamber, the at least one electrical resistance can extend along a supporting surface inside the cooking chamber, such as for example the lower surface of said chamber and/or at least one of the lateral surfaces and/or the upper surface. By way of non-limitative example, the electrical resistance can, in a known manner, adopt the form of a concentrically wound coil or describe a plurality of castellations between two opposite ends of said cooking chamber.

Preferentially, the primary heating means comprises an electrical resistance situated below the moveable plate supporting the culinary preparations. It extends laterally on the one hand between the lateral faces of the cooking chamber and on the other hand between the front and rear faces of said cooking chamber. It is thus possible both to heat the cooking chamber evenly by convection and preferentially to supply a thermal power by radiation at the surface of the bottom of the moveable plate. As the culinary preparations are loaded on the upper surface of said moveable plate, this advantageous arrangement makes it possible to orientate preferentially a part of the heating generated by such an electrical resistance for cooking the lower part of said culinary preparation, typically the dough in the case of a pizza.

The primary heating means can also comprise a second electrical resistance situated above the moveable plate. This second electrical resistance can adopt a form similar to that of the first electrical resistance placed below the moveable plate.

According to the first aspect of the invention, the moveable plate of the cooking device can in particular displace the culinary preparations inside the cooking chamber in order to better control the cooking thereof. In fact, in the case where a "cold spot" is present in the cooking chamber, for example by failure of the primary heating means, then the displacement of the culinary preparations in the chamber makes it possible to distribute the thermal energy deficit over all the culinary preparations which then temporarily pass through the "cold spot". Furthermore, the displacement of the moveable plate inside the cooking chamber makes it possible to load all the culinary preparations inside the cooking chamber from a single area, regardless of the cooking site.

Advantageously, the present invention implements a rotary displacement of the moveable plate, the rotation shaft preferentially being situated at the centre of said cooking chamber and in a direction substantially vertical and perpendicular to the surface of the plate. The moveable plate is driven in rotation by means of a drive motor, for example of the stepping motor type.

According to the first aspect of the invention, the device comprises secondary heating means comprising a plurality of heating elements situated above the plate so as to heat preferentially the upper surface of a culinary preparation loaded on one of the cooking sites of the plate.

Preferentially, the device comprises as many heating elements as cooking sites, each heating element being situated directly above the cooking site with which it is associated.

The heating elements are arranged in order to follow the displacement of the moveable plate, such that at each moment, each heating element is situated above the cooking site with which it is associated. The heating elements and the moveable plate can be driven by common or separate drive means. In the latter case, the drive means are controlled by one and the same control unit, also called controller. By way of example, the moveable plate and the heating elements can be arranged in order to be driven in rotation inside the cooking chamber. This rotation can be carried out by means of a common shaft for the moveable plate and the heating elements. Alternatively, the rotation can be carried out via specific separate motor elements for the moveable plate and the heating elements. In this way, each heating element mainly heats one (and preferentially only one) culinary preparation: the one which is situated just underneath.

Thus, the secondary heating means make it possible to supply an additional thermal power to that supplied by the primary heating means. They also make it possible to supply a specific localized thermal power to each cooking site, thus allowing different cooking of the culinary preparations loaded on each cooking site.

In a variant embodiment of the present invention, the cooking chamber can adopt the form of a tunnel oven and the moveable plate can comprise one or more conveyor belt(s) arranged in order to translate one or more culinary preparations inside the cooking chamber and between two opposite faces. The culinary preparations can then be distributed on the different cooking lines as a function of the advance of the conveyor belt(s), as well as along each cooking line. Several culinary preparations can then be loaded "side-by-side". In other words, the culinary preparations can be loaded on cooking sites distributed in a two-dimensional grid inside the cooking chamber. The length of the cooking chamber and/or the speed of advance of the conveyor belt(s) are arranged so that the culinary preparations loaded at the entrance to the cooking chamber are cooked when they reach the exit (situated on the opposite face of the cooking chamber).

The primary heating means is then situated preferentially below the conveyor belt(s), so as to heat the cooking chamber as uniformly as possible, both in the direction of advance of the conveyor belt and also laterally.

The secondary heating means are preferentially situated above the conveyor belt of the culinary preparations, organized in a two-dimensional grid of heating elements so that each culinary preparation loaded on the conveyor belt has a heating element directly above, regardless of the advance of the conveyor belt(s). In other words, the heating elements are arranged in a two-dimensional grid comparable to that of the cooking sites, so that each cooking site passing through the cooking chamber has a heating element directly above.

Ingeniously, the cooking device according to this variant embodiment makes it possible to cook culinary preparations with different temperatures, each line of heating elements being for example programmed for a particular cooking cycle corresponding to a particular recipe. It is possible in particular to define different cooking times for each conveyor belt by changing the speed of travel thereof inside the cooking chamber. By way of non-limitative example, the controller can be programmed so that the speed of travel of a first conveyor belt—and if necessary that of the conveyor belt displacing the corresponding heating elements—corresponds to cooking the culinary preparation in two minutes forty seconds, while that of a second conveyor belt—and if necessary that of the conveyor transporting the corresponding heating elements—corresponds to a duration of passage through said cooking chamber of three minutes fifty seconds.

The secondary heating means are driven in translation by a conveyor belt, so as to follow the movement of the culinary preparation when it passes through the cooking chamber in order to be cooked. At the exit from the cooking chamber, the heating elements are returned to the entrance by the conveyor belt(s). The two-dimensional grid of heating elements makes it possible to provide individualized cooking inside the cooking chamber with a very high performance.

According to an advantageous improvement of this variant embodiment, each cooking line can be defined using an independent conveyor belt and/or preferentially be reserved for a particular type of culinary preparation or of cooking.

Part of the heat energy produced by a heating element associated with a cooking site can optionally reach one or more other adjacent cooking sites. However, for a given cooking site, the energy received from the other heating elements is insignificant with respect to that supplied by the heating element with which it is associated. By way of example, it is preferentially less than 20% of the energy received by the heating element associated with the cooking site.

Advantageously, the primary heating means can deliver a nominal power of 7 kW for the entire cooking chamber while each heating element can deliver a nominal power of 1 kW.

Preferentially, the type, dimensions, form and positioning of the heating elements are selected so that each heating element supplies a localized heat energy onto the corresponding cooking site, without influencing the cooking of the culinary preparation situated on the adjacent cooking site. It is also preferable to select heating elements of the radiant type, so that the thermal power produced is mainly transmitted by radiation rather than by convection. Furthermore, it is also preferable to select heating elements the area of which is advantageously less than or equal to the surface area occupied by the culinary preparation situated below. By way of non-limitative example, a secondary heating means can adopt the form of a spiral electrical resistance the outside diameter of which is less than or equal to the lateral dimensions of the corresponding culinary preparation.

According to a feature of the invention, the device further comprises a controller programmed in order to regulate separately the primary heating means and each heating element of the secondary heating means. It is thus possible to control the thermal power of each heating means accurately, for the accurate adjustment thereof to the corresponding culinary preparation and to cook several culinary preparations simultaneously in an individualized manner. In this way, the risks of spoiling the cooking of the culinary preparations present in the cooking chamber are reduced. It is also possible to define in this way cooking cycles comprising particular thermal powers and durations, a cooking cycle being capable of comprising several phases of variable durations and/or powers. Furthermore, the cooking device according to this improvement makes it possible to cook culinary preparations composed of frozen ingredients and chilled ingredients for example, for which the energy input necessary in order to obtain optimum cooking is different. In the particular case given by way of non-limitative example of cooking a pizza the dough of which is chilled and the ingredients of which placed on the surface thereof are frozen, then the heating elements can be controlled at a heating power such that it allows optimum defrosting, while the cooking of the dough, determined mainly by the primary heating means, can be provided semi-independently.

More particularly, the primary heating means can be regulated so as to maintain an average temperature of the cooking chamber comprised between 250° C. and 330° C. in order to cook the chilled dough for a duration varying between 2 and 6 minutes. The secondary heating means can be controlled through three successive steps; making it possible in the first step, to defrost the ingredients placed on the surface of the sheeted dough, then in the second step, to evaporate the water released during the first step, and finally in the third step, to cook the ingredients.

The controller can thus be programmed so that, in the course of a cooking cycle of a culinary preparation, a power of the heating element associated with the cooking site receiving the culinary preparation is regulated so as to successively defrost ingredients of the culinary preparation, evaporate the water resulting from the defrosting and cook the culinary preparation.

The heating temperatures and/or durations of each of the three steps can be different. Thus, typically but not exclusively, the defrosting step can extend over approximately one quarter of the total cooking time of a pizza; the step of evaporation of the water can extend over approximately one half of the total cooking time of a pizza; and the step of cooking the ingredients can extend over approximately one quarter of the total cooking time of a pizza.

In a comparable manner, the heating powers utilized while cooking a pizza can be different for each of the three steps described above. Thus, typically but non-exclusively, the defrosting step can utilize a heating power of the order of one half of a reference power, for example the nominal power of the primary heating means; the step of evaporating the water can utilize a heating power comprised between 1 and 1.5 times the reference power; and the step of cooking the ingredients can utilize a heating power of the order of double the reference power.

The primary heating means is advantageously regulated so that the average temperature of the cooking chamber is kept constant with respect to a set point.

The secondary heating means can be controlled with respect to radiant thermal power, or regulated as a function of at least one sensor placed in the cooking chamber, and more particularly at the level of each cooking site. By way of non-limitative example, such a sensor can be a temperature sensor, or an infra-red sensor or also an optical sensor in order to measure the appearance of the pizza loaded on the corresponding cooking site, the power of the corresponding secondary heating means being regulated so as to follow for example the above-described three steps of defrosting, evaporation and cooking of the ingredients.

Thus, according to a particular embodiment, the controller can be programmed so that, in the course of a cooking cycle of a culinary preparation, the heating element associated with the cooking site receiving the culinary preparation supplies to the culinary preparation a heat energy, called secondary heat energy, different from—and preferentially comprised between one half of and twice greater than—a heat energy called primary heat energy, supplied to the culinary preparation by the primary heating means.

To this end, it is possible to program the controller so that, during a cooking cycle of a culinary preparation, the secondary thermal power supplied by the heating element associated with the cooking site receiving the culinary preparation is different from the primary thermal power supplied by the primary heating means to said culinary preparation, the thermal power supplied by the heating element associated with each cooking site being capable of varying during a cooking cycle, in particular according to the above-described three steps.

By way of non-limitative example, the primary heating means can be controlled to 10% of its nominal power in order to raise and maintain the temperature of the cooking chamber at an average temperature of 290° C.+/−40° C. Generally, but non-limitatively, the primary heating means is regulated at a temperature or thermal power that is constant or almost constant, the objective being to maintain a constant even temperature in the oven in order to ensure optimum cooking. On the other hand, the heating elements of the secondary heating means can themselves be controlled in a constant or variable manner as a function of the corresponding culinary preparations and according to predefined cooking cycles. Generally, each heating element is controlled between 5% and 100% of its nominal power.

The regulation of the secondary thermal power emitted by each heating element can depend on the recipe of the corresponding culinary preparation and/or the storage state of the ingredients (chilled or frozen) and/or according to the above-described three steps (defrosting, evaporation, cooking). For example increasing or decreasing power gradients can be produced in the course of a cooking cycle in order to supply a variable thermal power and for optimum cooking of the corresponding culinary preparation.

Such a differentiation of the energy input provided by the primary heating means on the one hand and the heating elements on the other hand is particularly advantageous for cooking pizzas for example, for which the requirements for cooking the dough and that of the ingredients placed on the surface thereof are not always identical.

Even more specifically, the cooking device according to the first aspect of the invention ingeniously makes it possible to obtain optimum cooking for pizzas produced from chilled dough and frozen toppings. In fact, in such a configuration the energy input necessary for optimum cooking of such a combination is particularly difficult to supply. The dough can cook rapidly while the topping placed on the surface thereof must first be defrosted before being cooked: it is therefore necessary to supply heating that is at first low for the defrosting of said topping before increasing the heating power in order to evaporate the water resulting from the defrosting and to properly cook said topping.

Thus, the device according to the present invention makes it possible to ensure optimum cooking by means on the one hand of the primary heating means situated below the moveable plate and making it possible in particular to cook the dough at a constant temperature, and on the other hand of the heating elements which, placed above each cooking site, make it possible to supply a variable thermal power adapted to any cooking cycle whatsoever, in particular defrosting then cooking. It is thus possible to cook a culinary preparation composed of frozen and refrigerated ingredients using one and the same device and in the course of one and the same procedure. As the device according to the invention comprises a plurality of cooking sites, it is thus possible to control and carry out such cooking for several culinary preparations loaded in the cooking chamber, each culinary preparation capable of being cooked according to cooking cycles that are different in terms of temperature and/or heating power and/or duration.

Advantageously, the device according to any one of the variants of the first embodiment of the present invention further comprises a plurality of temperature sensors, each temperature sensor being associated with a cooking site and being arranged in order to measure a temperature, called local temperature, in the vicinity of this cooking site, the controller being programmed in order to regulate the thermal power of the heating element associated with the cooking site and/or the primary heating means as a function of said local temperature. It is thus possible to provide a control system for each heating element as a function of the measured temperature at the level of each corresponding cooking site in order to provide perfect cooking of the culinary preparations, thus allowing even more accurate control of the thermal power supplied to each culinary preparation.

According to a particular embodiment, the device may comprise only a single temperature sensor for measuring the temperature of all the heating elements and/or the cooking sites. To this end, said temperature sensor can be fixed so that it is not driven in rotation by the moveable plate and/or the heating elements: alternatively, and cyclically as a function of the rotation of said moveable plate, the temperature sensor measures the heating temperature in proximity to each secondary heating means when the latter passes in proximity to said temperature sensor.

Preferentially, the device according to the invention further comprises a temperature sensor arranged in order to measure a temperature, called overall temperature, within the cooking chamber, the controller also being programmed in order to regulate the thermal power of the primary heating means and/or of the heating elements as a function of the overall temperature.

In this way, it is possible to better control the temperature of the cooking chamber, control of the thermal power developed by the primary heating means being capable of being carried out as a function of the temperature measurements in the cooking chamber, and thus improve the quality of the cooking of the culinary preparations loaded therein.

Specifically, the controller is programmed in order to regulate the thermal power of each heating element of the secondary heating means as a function of the culinary preparation loaded on each associated cooking site.

Some culinary preparations require quite a simple thermal programming, for which the heating power is constant throughout the entire cooking time. By way of example, a pizza produced according to the recipe called "Queen" requires a cooking time of 240 seconds with a heating power of the heating elements of the secondary heating means of the order of 30% of the nominal power of said heating elements. A pizza produced according to the recipe called "Four cheese" requires a cooking time of 210 seconds with a heating power of the heating elements of the secondary heating means of the order of 20% of the nominal power of said heating elements.

In contrast, other culinary preparations may require a more complex thermal programming, implementing a succession of heating ranges, each heating range being defined by a particular heating power—and thus cooking temperature—and duration, the total duration of all the cooking steps defining the cooking time of said culinary preparations. By way of example, a pizza produced according to the recipe called "Oriental" requires a cooking time of 240 seconds in the course of which, during a first range of 60 seconds, the heating elements of the secondary heating means are configured at a heating power of the order of 20% of the nominal power thereof; during a second range of 120 seconds, the heating elements of the secondary heating means are configured to a heating power of the order of 40% of the nominal power thereof; and during a third range of 60 seconds, the heating elements of the secondary heating means are configured to a heating power of the order of 70% of the nominal power thereof.

By way of example, the operating power of the heating elements of the secondary heating means is comprised between 20% and 100% of the nominal power thereof.

According to a feature that is compatible with any one of the variants of the first embodiment of the present invention, each cooking site is arranged in order to limit sticking of the culinary preparation when cooking.

More generally, each cooking site can be arranged in order to allow the loading and removal of a culinary preparation while limiting its displacement during cooking in the device according to the invention due to the rotation of the moveable plate. By way of non-limitative example, each cooking site can be designed in a non-stick culinary material, at least on an upper surface layer, or comprise a specific non-stick culinary coating in order to limit sticking, such as for example a coating of the TUFRAM® type.

The material selected to produce the cooking site must preferentially be a good heat conductor in order to transfer the thermal power produced at the level of the primary heating means situated below to the corresponding culinary preparation.

Preferably, the selected material is non-porous and easy to clean. For example, this may be firestone, the thermal properties of which are particularly suitable for this type of cooking device.

Preferentially, each cooking site has a discontinuous reception surface extending as a projection with respect to the moveable plate and on which the culinary preparation can be loaded, so as to allow said culinary preparation to be gripped from below.

Specifically, a cooking site can have apertures opening onto the reception surface and extending parallel to this surface, so as to allow a comb-shaped oven peel to be inserted into said apertures, and the culinary preparation to be lifted from the reception surface. In other words, a cooking site can adopt the form of a grid or blocks, thus forming a plurality of localized, discontinuous projecting structures. The arrangement of the blocks or the grid may be regular—the space between two projecting structures being even—or irregular, random.

This configuration is particularly suitable for cooking pizzas for example, the latter being loaded directly on such a discontinuous surface. In fact, on the one hand this configuration makes it possible to limit sticking of the pizza on the cooking site—by limiting the contact surface with the underside of the pizza dough. It also makes it possible to promote cooking of the pizza dough by allowing the air present in the cooking chamber to circulate below said pizza dough. On the other hand, this configuration makes it possible to ensure that the pizza is perfectly held despite the rotation of the moveable plate, the pizza dough being able to sink slightly between the contact surfaces, but without thereby becoming torn, thus preventing it from experiencing a lateral movement during cooking.

According to another feature that is compatible with any one of the variants of the first embodiment of the present invention, the device further comprises a motorized door, and the controller is also programmed in order to control the opening and closing of said motorized door.

It is thus possible to determine the parameters making it possible to control the opening and/or the closing of the door of the cooking device automatically, and to make it possible to minimize the heat loss associated with the instances of door opening in order to load a culinary preparation into, or remove it from, the device according to the invention. The control parameters can in particular be the moments of opening and/or closing of the door. The cooking of the culinary preparations is thus optimized by ensuring a temperature that is as constant as possible inside the cooking chamber—or according to a predetermined set point as a function of the culinary preparations present in the cooking chamber.

Advantageously, the controller can also be programmed in order to adapt the speed of rotation and/or the direction of rotation of the moveable plate and/or in order to regulate the primary heating means and/or the heating elements of the secondary heating means in order to present one of the cooking sites in proximity to the door at the end of a cooking cycle of the culinary preparation received by said cooking site.

It is thus possible to further reduce the door opening time and to keep a constant temperature inside the cooking chamber—or according to a predetermined set point as a function of the culinary preparations present in the cooking chamber.

Opening of the door can be triggered automatically when the cooking site supporting the culinary preparation the cooking time of which is reaching its end arrives in proximity to the door. Advantageously, the controller determines the moment of opening of the door as a function of the time required for the cooking site the culinary preparation of which is almost cooked to be in proximity to the door when the cooking cycle ends and adapts the speed and/or the direction of rotation of the moveable plate. It is thus possible to reduce the dimensions of the door such that they correspond substantially to the lateral dimensions of a cooking site, thus promoting the heat capacity of the cooking chamber.

Optionally, the controller determines on the one hand the opening time of the door within a range of three seconds distributed outside and within the predetermined cooking time. In addition, the controller adapts the speed of rotation and/or the direction of rotation of the moveable plate so as to present a culinary preparation, the cooking cycle of which is ending, in proximity to the door.

Advantageously, the moveable plate is not stopped when a culinary preparation is loaded onto or removed from said plate.

Preferentially, the controller can also be programmed in order to adapt the speed and/or the direction of rotation of the moveable plate in order to present a vacant cooking site in proximity to the door before the opening of said door. Thus, as soon as the door is opened, a culinary preparation can immediately be loaded on the cooking site that is directly in front—thus the most accessible—and the time during which the door is open is thus minimized in order to reduce heat loss, better regulate the temperature inside the cooking chamber and/or the cooking sites.

According to a feature, the controller can also be programmed in order to determine the vacant cooking site that is the closest to the cooking site the culinary preparation of which is the next one to reach the end of a cooking cycle and adapt the speed of rotation and/or the direction of rotation of the moveable plate so as to minimize the time during which the door is open.

Alternatively, the controller can also be programmed in order to present a vacant cooking site in proximity to the door in order to make it possible to load a culinary preparation for cooking thereon before adapting the speed and/or the direction of rotation of the moveable plate in order to present in proximity to the door a cooking site on which a culinary preparation is ready to be extracted.

It is thus possible on the one hand to optimize the management of the cooking sites and on the other hand to minimize the durations of opening of the door. This optimization can be carried out with respect to the vacant sites and/or the cooking times corresponding to the culinary preparations to be cooked.

According to a second aspect of the present invention, there is proposed a method for optimizing the cooking of at least one culinary preparation in a cooking device according to the first aspect of the invention or one of its improvements, said method for optimizing the cooking comprising at least one iteration of the following steps:
- optionally: opening the door;
- loading a culinary preparation onto a free cooking site of the moveable plate, said moveable plate capable of rotating inside said cooking device;
- optionally: closing the door;
- controlling the heating element of the secondary heating means associated with the cooking site as a function of a cooking cycle depending on the culinary preparation loaded thereon, the cooking cycle being defined in particular by at least one heating power and at least one duration;
- at a moment called moment of extraction, situated within an interval comprised between five and sixty seconds from the end of the cooking cycle, and preferentially five seconds before the end of said cooking cycle:
  - rotating the moveable plate so as to present the cooking site in proximity to the door;
  - optionally: opening the door;
  - extracting the culinary preparation;
  - optionally: closing the door.

Advantageously, the method according to the second aspect of the invention comprises the following steps when an additional culinary preparation is to be cooked in the cooking device, the following steps being capable of being carried out before the extraction of a culinary preparation:
- identifying a first cooking site on which a culinary preparation is on the point of ending its cooking cycle. Preferentially, this may be a culinary preparation the elapsed cooking time of which corresponds to 90-100% of the total duration of said cooking cycle;
- selecting a second vacant cooking site that is the closest to the first cooking site;
- rotating the moveable plate so as to present the second selected cooking site in proximity to the door;
- loading the additional culinary preparation onto the selected vacant cooking site;
- rotating the moveable plate so as to present the first cooking site in proximity to the door, said culinary preparation ending its cooking cycle during said rotation;
- extracting the culinary preparation situated on the first cooking site.

It is thus possible, ingeniously, to limit the durations of opening of the door and thus to limit the heat losses from the cooking device according to the invention.

Preferentially, the method according to any one of the improvements of the second aspect of the invention can comprise programming by the controller of the cooking of a culinary preparation present on a cooking site of a device according to one of the first aspects of the invention and according to:
- a constant cooking cycle, the power of a heating element of the secondary heating means being constant throughout the entire duration of said cooking cycle; or
- a cooking cycle by stages, comprising a plurality of stages during each of which the power of a heating element of the secondary heating means is constant, said power values being capable of varying from one stage to another and/or the durations of each stage capable of being different.

Preferentially, for a cooking cycle by stages, the power of the heating elements of the secondary heating means varies from one stage to another in a monotonically increasing manner.

Each cooking site can be programmed according to a different cooking cycle each cooking site being capable of being programmed consecutively according to any cooking cycle.

According to a particular embodiment, the controller controls the cooking of a culinary preparation present on a cooking site according to a cooking cycle comprising the following successive steps:
- regulating a power of the heating element associated with the cooking site receiving the culinary preparation at a first power set point, so as to defrost ingredients of the culinary preparation,
- regulating the power of the heating element associated with the cooking site receiving the culinary preparation at a second power set point, so as to evaporate the water resulting from the defrosting, and
- regulating the power of the heating element associated with the cooking site receiving the culinary preparation at a third power set point, so as to cook the culinary preparation.

Preferentially, the speed of rotation and/or the direction of rotation of the moveable plate is adapted so as to minimize the periods during which the door is open.

Furthermore, the controller is programmed in order to limit the speed of rotation of the moveable plate to a speed less than 0.2 rpm in order to avoid generating an airflow in the oven which would affect the cooking of the ingredients.

According to this variant of the second aspect of the invention, the door of the cooking device is open only once, in order to load a culinary preparation on a vacant cooking site and then to extract from the cooking chamber a culinary preparation the cooking of which has ended.

It is thus possible to limit the heat losses associated with opening the door and to facilitate the handling operations of said culinary preparations by a cook, the latter being able to focus his attention on loading a first culinary preparation into the cooking device and extracting a second culinary preparation, the cooking device automatically offering him the corresponding cooking sites.

According to a third aspect of the invention, an automated machine is proposed for designing culinary preparations comprising at least a part of the following elements:
- a storage chamber for ingredients used for preparing said culinary preparations;
- an assembly station arranged on the one hand for picking a predetermined quantity of ingredients stored in the storage chamber, and on the other hand for placing said predetermined quantity of ingredients on a substrate of a culinary preparation;
- a cooking device for culinary preparations according to any one of the embodiments of the first aspect of the present invention;
- a handling system arranged for transferring at least one of the assembled culinary preparations between the assembly station and the cooking device;
- a processor unit programmed in order to control said automated machine so as to prepare a culinary preparation following a predetermined recipe.

According to this third aspect of the invention, the device according to any one of the embodiments of the first aspect can be incorporated into a design centre for "to order" and "take-away" culinary preparations, such as for example an automated machine for producing pizzas. The device according to the invention can thus be incorporated into an automation chain and allow the simultaneous cooking of several culinary preparations, optionally all different and requiring different cooking times, cooking temperatures and cooking cycles, while thus ensuring high production speeds.

In the case of the production of pizzas, for which the average cooking time varies between two minutes and five minutes, the cooking device according to any one of the embodiments of the first aspect of the invention makes it possible to obtain a throughput of the order of one pizza every 30 seconds.

According to a fourth aspect, the use of the cooking device and/or of the method and/or of the automated machine is according to any one of the first, second or third aspects of the present invention respectively, or their improvements for cooking at least one assembled pizza.

Varied embodiments of the invention are envisaged, incorporating the different optional characteristics disclosed herein according to the totality of the possible combinations thereof.

BRIEF DESCRIPTION OF THE DRAWINGS

Other characteristics and advantages of the invention will become apparent from the following description on the one hand, and from several embodiments given indicatively and non-limitatively with reference to the attached diagrammatic drawings on the other hand, in which.

DETAILED DESCRIPTION

The embodiments that will be described hereinafter are in no way limitative; variants of the invention can in particular be envisaged comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, the elements common to several figures retain the same reference.

Figure 1:
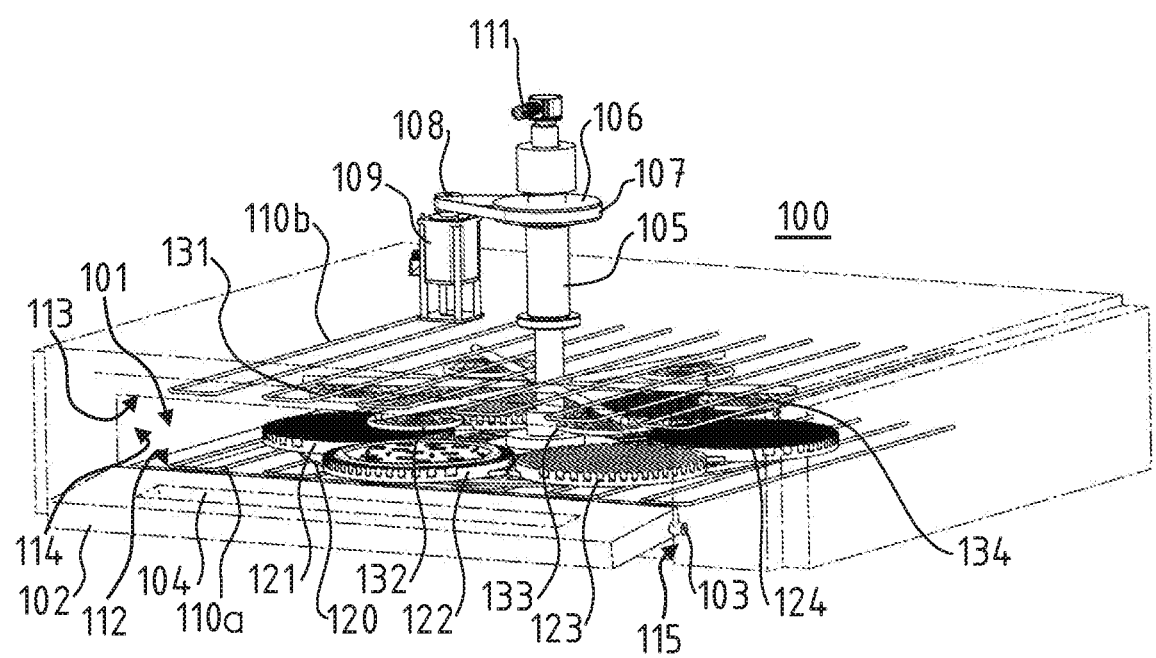
FIG. 1 shows a perspective view of the cooking device according to the invention, in which the cooking chamber is shown as transparent.
Figure 2:
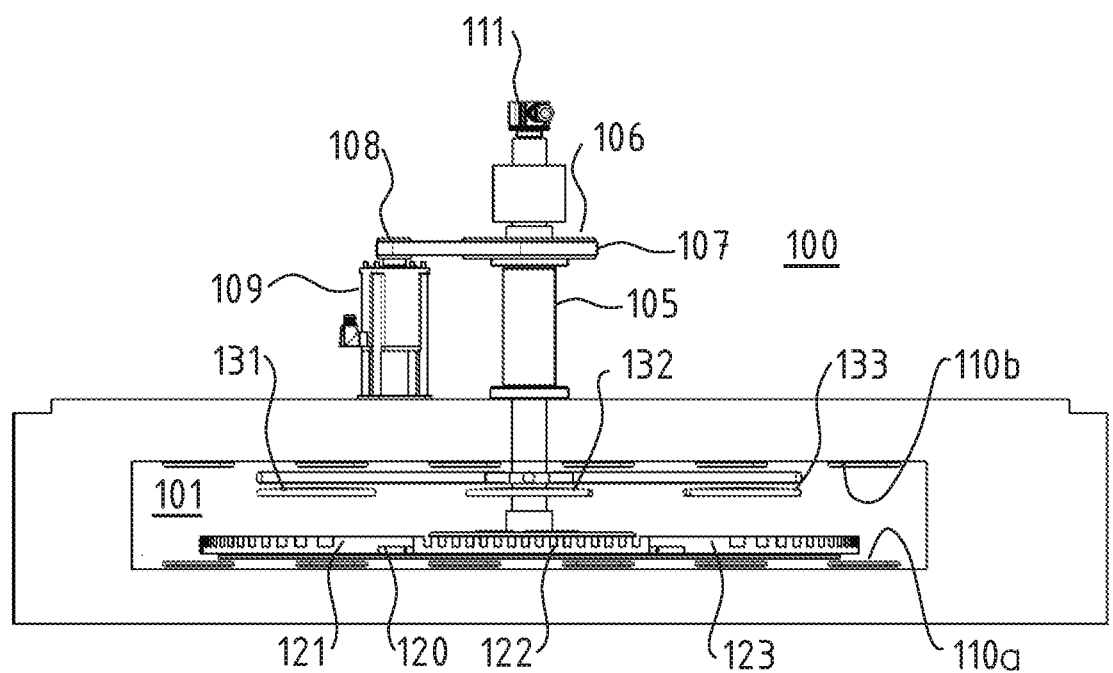
FIG. 2 shows a front view of the cooking device according to the invention.

With reference to FIGS. 1 and 2, the cooking device 100 according to any one of the improvements of the first embodiment will be described.

The device 100 comprises a cooking chamber 101 inside which culinary preparations can be cooked. To this end, primary heating means 110 are loaded inside said cooking chamber 101 in order to produce a thermal power that is transmitted to said culinary preparations, for example by convention or by radiation. In FIGS. 1 and 2, two primary heating means 110a and 110b are shown, respectively at the level of the lower surface 112 and the upper surface 113 of the cooking chamber 101. Each primary heating means comprises a plurality of electrical resistances that extend overall, on the one hand between the inner lateral faces 114 and 115 of the cooking chamber 101 and on the other hand between the front and rear faces of said chamber 101, so as to distribute a thermal power that is as even as possible within said chamber 101. To this end, as is shown in FIGS. 1 and 2, the electrical resistances 110a and 110b can each be composed of independent electrical resistances juxtaposed side by side, preferentially regularly spaced apart. Alternatively, each primary heating means 110a and 110b can consist of a single electrical resistance extending in castellated form. The diameter, the length and the material of the electrical resistance are dimensioned as a function of the desired electrical power and the cooking temperatures. Typically, the electrical resistance is arranged in order to heat the cooking chamber 101 to a temperature comprised between 50° C. and 400° C., and preferentially between 200° C. and 380° C.

Preferentially, the primary heating means 110a and 110b are controlled by a controller (not shown) so as to regulate the temperature inside the cooking chamber 101.

Inside the cooking chamber 101, a moveable plate 120 is positioned in an intermediate position: above the primary heating means 110a situated on the lower face 112 and below the upper face 113 of the cooking chamber.

The moveable plate 120 is composed of a material compatible with the heating temperatures that can be reached in the cooking chamber 101, such as for example a steel alloy and/or firestone.

According to certain variant embodiments, the moveable plate 120 can be solid, or pierced in order to facilitate ventilation—natural or forced—inside the cooking chamber.

A shaft 105 allows a rotation shaft to be defined by forming a pin joint between the moveable plate 120 and the cooking chamber 101. Optionally, the moveable plate can have a position that is adjustable along the shaft 105 in order to adjust the distance between said moveable plate 120 and the primary heating means 110a and/or 110b.

Preferentially, the outside diameter of the moveable plate 120 is less than or equal to the lateral extension of the primary heating means, such that any point of said moveable plate 120 passes above and/or below a primary heating means during the rotation of said moveable plate 120.

The shaft 105 is motorized via an actuator that can be of any type. In the embodiment shown in FIGS. 1 and 2, a stepping motor 109 produces a primary rotation about the shaft 108 and a transmission belt 107 transmits said rotational movement to the shaft 105 via a transmission sheave 106. Preferentially, the actuator 109 is controlled by the controller so as to regulate the speed and/or the direction of rotation of the moveable plate.

At the upper end of the shaft 105, a rotary encoder 111 makes it possible to measure the angular position of the motor 109, and consequently the angular position of the moveable plate driven in rotation by said motor 109. Cooking sites 121-126 are arranged on the upper surface of the moveable plate 120, in order to allow culinary preparations to be loaded thereon, cooked and removed. Preferentially, the cooking sites are evenly distributed about the shaft 105. In the embodiment shown in FIGS. 1 and 2, six cooking sites 121-126 are shown, evenly distributed, with an angle of 60° between the central positions of two adjacent cooking sites.

Each cooking site 121-126 is arranged in order to promote heat exchange, in particular by conduction. For example, a cooking site 121-126 can be produced from a refractory material that is compatible with culinary use.

Furthermore, each cooking site 121-126 is arranged in order to limit sticking of the culinary preparation on the upper surface of each of said cooking sites 121-126. In the embodiment shown in FIGS. 1 and 2, each cooking site 121-126 adopts the form of a one-dimensional grid of periodically-spaced castellations. Thus, the contact surface with the culinary preparation that may be loaded thereon is restricted, and sticking limited. The castellations are for example arranged so that as a minimum 20% of the lower surface of the culinary preparation is in contact with the cooking site, and more particularly with the contact surface of said cooking site.

In addition, each cooking site 121-126 is arranged in order to limit lateral displacements of the culinary preparations on the surface of each of said cooking sites 121-126. In the embodiment shown in FIGS. 1 and 2, each cooking site 121-126 has a castellated shape in order to allow the dough—for example when a pizza is cooked in such a cooking device 100—to sink slightly between two consecutive castellations and thus prevent lateral sliding during rotation of the moveable plate 120.

A door 102 that is mobile in rotation about a shaft 103 makes it possible to close or open said cooking chamber 101. The door 102 can also comprise a glazed surface 104 in order to allow visual inspection of at least a part of the cooking sites 121-126.

Figure 3:
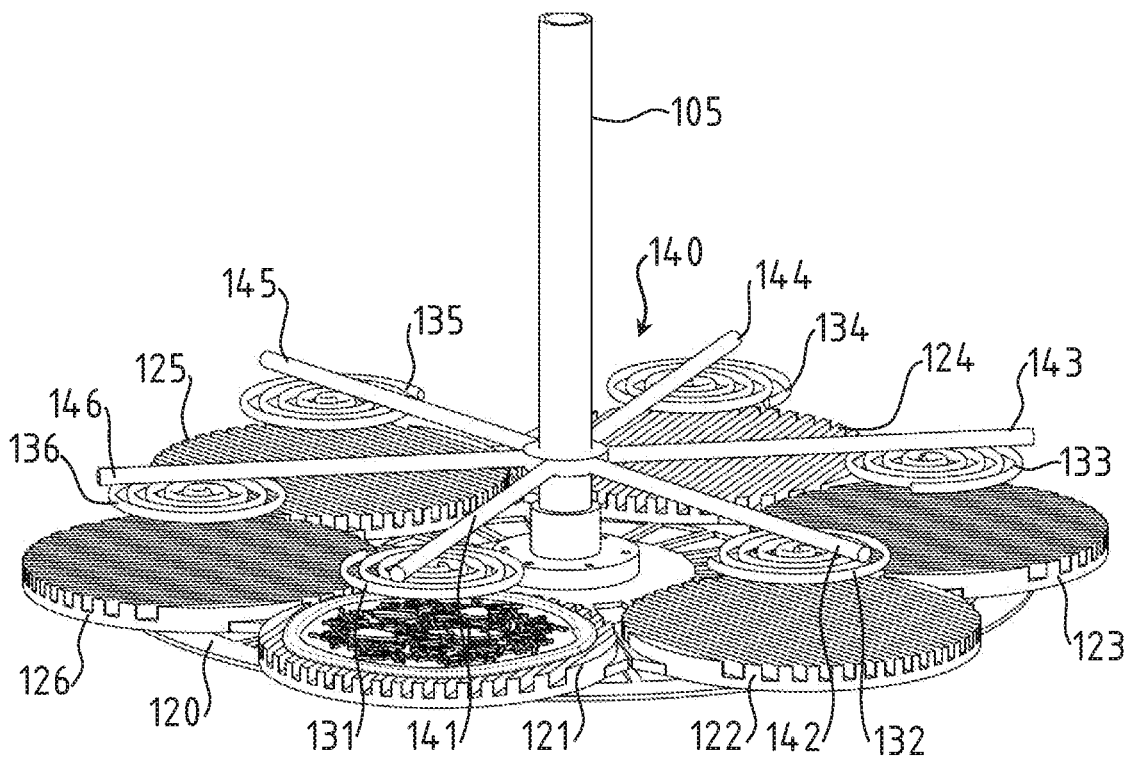
FIG. 3 shows in a detail view the cooperation between the moveable plate, the cooking sites and the secondary heating means.

FIG. 3 demonstrates more particularly the moveable plate 120 as well as the heating elements of the secondary heating means 131-136 implemented within the cooking chamber 101.

The secondary heating means thus comprise a plurality of heating elements, each heating element directly above one, and only one, cooking site 121-126, thus making it possible to supply a localized thermal power to the corresponding culinary preparation, and preferably only to the latter. For example, the heating elements 131-136 can be arranged in order to emit localized radiant heat at the level of the corresponding cooking site 121-126.

Typically, the heating elements 131-136 are situated at a distance comprised between 3 cm and 8 cm from the corresponding cooking site.

In the embodiment shown in FIG. 3, the heating elements 131-136 consist of electrical resistances adopting the form of a spiral. The centre of each spiral is substantially vertically aligned with the centre of each corresponding cooking site respectively. The outside diameter of each spiral is less than or equal to the outside diameter of each cooking site. Preferentially, in order to limit heat transmission onto the adjacent cooking site, the outside diameter of the spiral is strictly less than that of the corresponding cooking site.

Advantageously, it is less than or equal to one half of the outside diameter of the corresponding cooking site.

The heating elements 131-136 are supported by a bearing structure 140—for example star-shaped—each arm 141-146 of which makes it possible to position the corresponding heating element in the position defined above.

Furthermore, the bearing structure 140 is mobile in rotation inside the cooking chamber 101. In the embodiment shown in FIG. 3, the secondary heating means are rotated via the shaft 105. Rotary connectors make it possible to provide electrical continuity to each heating element 131-136.

Thus, even during the rotation of the moveable plate 120 inside the cooking chamber 101, each heating element 131-136 remains directly above the corresponding cooking site 121-126.

In the case where the bearing structure 140 is rotated by a motor shaft that is different from that rotating the moveable plate 120, then the controller is advantageously programmed in order to synchronize the rotation speeds of both, so as to retain this alignment.

Figure 4:
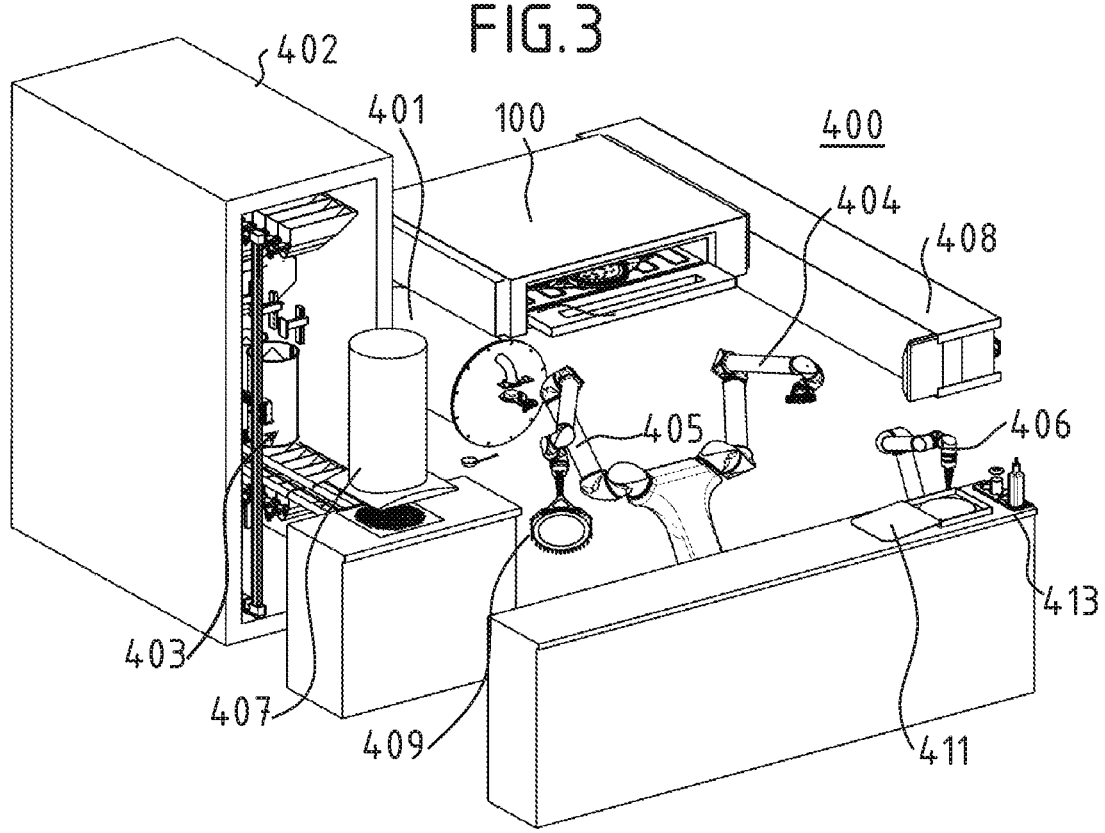
FIG. 4 shows the incorporation of the cooking device according to the invention into an automated machine for preparing culinary preparations.

FIG. 4 demonstrates the use of a device according to any one of the improvements of the first aspect of the invention in a system 400 for the automatic design of culinary preparations, and more particularly of pizzas.

According to a third aspect of the invention, the cooking device 100 can be incorporated into an automated machine 400 carrying out the design, cooking, and/or packaging and/or delivery of culinary preparations, particularly pizzas.

Thus, such an automated machine 400 can comprise:

a storage chamber 402 for ingredients suitable for use for preparing said culinary preparations;

an assembly station 403 arranged on the one hand for picking a predetermined quantity of ingredients stored in the storage chamber, and on the other hand for placing said predetermined quantity of ingredients on a substrate of a culinary preparation;

a cooking device 100 for culinary preparations according to any one of the embodiments according to the first aspect of the invention;

a handling system 404-406 for transferring at least one of the assembled culinary preparations between the assembly station 403 and the cooking device 100;

a processor unit (not shown) programmed in order to control said automated machine 400 so as to prepare a culinary preparation following a predetermined recipe.

For greater clarity, an example will be given for the preparation of a pizza, the automated machine 400 however being arranged for preparation of a wide variety of culinary preparations, as stated above.

In the example shown in FIG. 4, the automated machine 400 also comprises a container with chilled dough 401, a forming device 407 for flattening the dough used for preparing said pizza, and a packaging distributor 408. The handling system implemented comprises in particular three multi-axis robotic arms 404-406. These robotic arms are arranged in order to manipulate the pizza during preparation, for example via a (plane) peel 409, and to transfer it from one station to another.

Thus, during a first step, a predetermined quantity of dough—preferably chilled—is extracted from the container 401. This predetermined quantity is dimensioned so as to be capable of being sheeted to the desired dimensions of a pizza.

To this end, the predetermined quantity of chilled dough is transferred to the former device 407 which gives said predetermined quantity of chilled dough the desired shape, called sheeted, of the dough on which the pizza will be prepared.

Optionally, a sauce (for example tomato or white sauce-based) is poured and spread in order to prepare the substrate.

Then, the dough thus prepared is transferred to the assembly station 403 where the predetermined ingredients will be put in place. These ingredients are picked in predetermined quantities from the storage chamber 402.

Preferentially, said ingredients are placed evenly in a random manner onto the surface of the pizza.

Then, the pizza is transferred to the cooking device 100 according to the invention.

Depending on the occupancy of the cooking sites, the processor unit determines the best strategy for loading a "ready-to-cook" pizza in the cooking device. To this end, it determines in particular the speed of rotation parameters of the rotary plate and/or the secondary heating means, and/or their direction of rotation, and/or the position of the vacant cooking sites.

Preferentially, opening of the door is synchronized with the rotation of the rotary plate, such that the door is open during the shortest possible time, for example when the cooking site on which the transported pizza is to be loaded arrives in proximity to the door.

In the case where the door is motorized, the door-opening motor is controlled in order to carry out said opening.

According to an additional or alternative embodiment, one of the robotic arms can open the door of the oven via a handle for example.

The cooking parameters are determined as a function of the type of pizza loaded into the oven. These parameters comprise in particular at least one duration and at least one power cycle. A cooking cycle can comprise several variable or constant cooking stages.

The primary heating means and/or the secondary heating means are controlled so as to ensure optimum cooking of the pizza.

Preferentially, only the primary heating means is controlled in order to supply at least one thermal power during at least a certain duration so as to heat the pizza at least partially.

Each cooking site can be controlled according to a particular cooking cycle, independently of the other cooking sites.

When the cooking of a pizza will soon reach the end, the processor unit determines the best strategy for minimizing the opening time of the door and ensuring that the optimum cooking time of said pizza is respected. Optionally, a margin of error of +/−10 seconds is tolerated with respect to the nominal cooking time.

To this end, the cooking site on which the pizza will soon be cooked is brought in proximity to the door. The door is opened during the shortest possible time, during which the robotic arm 404 takes said pizza using the peel 409.

The robotic arm 404 then loads the pizza thus cooked onto a packaging station 413 in order for it to be placed in a box 411 for example, and optionally sliced, optionally seasoned.

Of course, the invention is not limited to the examples which have just been described and numerous adjustments can be made to these examples without exceeding the scope of the invention. In particular, the various characteristics, forms, variants and embodiments of the invention can be combined together in various combinations to the extent that they are not incompatible or mutually exclusive. In particular, all the variants and embodiments described above can be combined together.

The invention claimed is:

1. A cooking device for culinary preparations, comprising:
a cooking chamber, capable of simultaneously receiving several individual culinary preparations;
a primary heating means, arranged in order to deliver a thermal power called primary thermal power, making it possible to heat the cooking chamber;
a moveable plate, capable of being displaced inside the cooking chamber by drive means, and comprising a plurality of cooking sites, each being arranged in order to receive a culinary preparation; and
secondary heating means, comprising a plurality of heating elements, moveable inside the cooking chamber via said drive means and arranged in order to follow a displacement of the moveable plate, each heating element being associated with one of the cooking sites and being arranged in order to deliver a thermal power called secondary thermal power making it possible to heat preferentially the top of this cooking site.

2. The device according to claim 1, characterized in that it also comprises a controller programmed in order to regulate separately the primary heating means and each heating element of the secondary heating means.

3. The device according to claim 2, characterized in that the controller is programmed so that, in the course of a cooking cycle of a culinary preparation, a power of the heating element associated with the cooking site receiving the culinary preparation is regulated so as to successively defrost ingredients of the culinary preparation, evaporate the water resulting from the defrosting and cook the culinary preparation.

4. The device according to claim 2, characterized in that it also comprises a plurality of temperature sensors, each temperature sensor being associated with a cooking site and being arranged in order to measure a temperature, called local temperature, in the vicinity of this cooking site, the controller being programmed in order to regulate the heating element associated with the cooking site as a function of said local temperature.

5. The device according to claim 2, characterized in that it also comprises a temperature sensor arranged in order to measure a temperature, called overall temperature, within the cooking chamber, the controller also being programmed in order to regulate the thermal power of the primary heating means as a function of the overall temperature.

6. The device according to claim 2, characterized in that the controller is also programmed in order to regulate the thermal power of each heating element of the secondary heating means as a function of the culinary preparation loaded on the associated cooking site.

7. The device according to claim 2, characterized in that it also comprises a motorized door, the controller also being programmed in order to control the opening and closing of the motorized door.

8. The device according to claim 7, characterized in that the controller is also programmed in order to adapt the speed of rotation and/or the direction of rotation of the moveable plate and/or in order to regulate the primary heating means and/or the heating elements of the secondary heating means, in order to present one of the cooking sites in proximity to the door at the end of a cooking cycle of the culinary preparation received by said cooking site.

9. The device according to claim 8, characterized in that the controller is also programmed in order to present a vacant cooking site in proximity to the door before the opening thereof and adapting the speed and/or the direction of rotation of the moveable plate.

10. The device according to claim 8, characterized in that the controller is also programmed in order to determine the vacant cooking site that is the closest to the cooking site the culinary preparation of which is the next one to reach the end of a cooking cycle and adapt the speed of rotation and/or the direction of rotation of the moveable plate so as to minimize the time during which the door is open.

11. The device according to claim 1, characterized in that the moveable plate is driven in rotation in the cooking chamber by means of a rotation shaft and a drive motor.

12. The device according to claim 1, characterized in that each cooking site is arranged in order to limit sticking of the culinary preparation during cooking.

13. The device according to claim 12, characterized in that each cooking site has a discontinuous reception surface extending as a projection with respect to the moveable plate and on which the culinary preparation can be loaded.

14. A method for cooking at least one culinary preparation in a cooking device according to claim 1, comprising at least one iteration of the following steps:
   loading a culinary preparation on a free cooking site of the moveable plate;
   controlling the heating element of the secondary heating means associated with the cooking site as a function of a cooking cycle depending on the culinary preparation loaded thereon, the cooking cycle being defined by at least one heating power and at least one duration;
   at a moment called moment of extraction, situated within an interval comprised between five and sixty seconds from the end of the cooking cycle:
      rotating the moveable plate so as to present the cooking site in proximity to the door; and
      extracting the culinary preparation.

15. The method according to claim 14, characterized in that, when an additional culinary preparation is to be cooked in the cooking device, the following steps are carried out:
   identifying a first cooking site on which a culinary preparation is on the point of ending its cooking cycle;
   selecting a second vacant cooking site that is the closest to the first cooking site;
   rotating the moveable plate so as to present the selected second cooking site in proximity to the door;
   loading the additional culinary preparation on the selected second cooking site;
   rotating the moveable plate so as to present the first cooking site in proximity to the door, said culinary preparation ending its cooking cycle during said rotation; and
   extracting the culinary preparation situated on the first cooking site.

16. The method according to claim 14, characterized in that the controller controls the cooking of a culinary preparation present on a cooking site according to a cooking cycle comprising the following successive steps:
   regulating a power of the heating element associated with the cooking site receiving the culinary preparation at a first power set point, so as to defrost ingredients of the culinary preparation;
   regulating the power of the heating element associated with the cooking site receiving the culinary preparation at a second power set point, so as to evaporate the water resulting from the defrosting; and
   regulating the power of the heating element associated with the cooking site receiving the culinary preparation at a third power set point, so as to cook the culinary preparation.

17. The method according to claim 14, characterized in that the speed of rotation of the moveable plate is adapted so as to minimize the periods during which the door is open.

18. An automated machine for the design of culinary preparations comprising:
   a storage chamber for ingredients suitable for use for preparing said culinary preparations;
   an assembly station arranged on the one hand for picking a predetermined quantity of ingredients stored in the storage chamber, and on the other hand for placing said predetermined quantity of ingredients on a substrate of a culinary preparation;
   a cooking device for culinary preparations according to claim 1;
   a handling system for transferring at least one of the assembled culinary preparations between the assembly station and the cooking device; and
   a processor unit programmed in order to control said automated machine so as to prepare a culinary preparation following a predetermined recipe.

19. Utilization of the device according to claim 1 for cooking at least one assembled pizza.

* * * * *